(12) United States Patent
Nomura et al.

(10) Patent No.: US 7,399,023 B2
(45) Date of Patent: Jul. 15, 2008

(54) GUIDE ROLLER OF SLIDE DOOR FOR VEHICLE

(75) Inventors: Takumi Nomura, Inuyama (JP); Teruo Abe, Inuyama (JP); Hiroshi Naito, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 204 days.

(21) Appl. No.: 11/335,524

(22) Filed: Jan. 20, 2006

(65) Prior Publication Data

US 2006/0158003 A1 Jul. 20, 2006

(30) Foreign Application Priority Data

Jan. 20, 2005 (JP) ............................. 2005-012755

(51) Int. Cl.
*B60J 5/06* (2006.01)
(52) U.S. Cl. ..................... 296/155; 296/146.1; 49/360
(58) Field of Classification Search .............. 296/146.1, 296/155; 49/360, 362
See application file for complete search history.

(56) References Cited

U.S. PATENT DOCUMENTS

2006/0010773 A1* 1/2006 Nomura et al. ................ 49/362

FOREIGN PATENT DOCUMENTS

JP 2003-176661 A 6/2003

* cited by examiner

*Primary Examiner*—Lori L Lyjak
(74) *Attorney, Agent, or Firm*—Browdy and Neimark

(57) ABSTRACT

In order to provide a guide roller which can be readily mounted on a support member and readily adjusted in position without reducing strength of a support shaft, according to the invention, when inserting a screw part of the shaft through a long hole of the support member and fixing the shaft by a nut on a back side, the screw part is inserted while contacting notched planes with contact parts, and an insertion position of the screw part is made adjustable in the long hole. It is possible, without necessity to form an engaging part for calking in the columnar shaped support shaft, to prevent reduction in strength of the guide roller, to position the guide roller with respect to a rail only by screwing the guide roller to the support member after previously fixing the support member to the slide door, and to make the operation efficient.

6 Claims, 4 Drawing Sheets

GUIDE ROLLER OF SLIDE DOOR FOR VEHICLE

BACKGROUND OF THE INVENTION

1. Field of the Invention

The present invention relates to a guide roller which rolls along a rail provided on a vehicle body side and is rotatably and pivotally supported by a support member connected to a slide door.

2. Description of the Prior Art

In a slide door for a vehicle, the slide door is slidably supported along a vehicle body side wall by rollably engaging an upper guide roller provided in a front end upper portion of the slide door, a center guide roller provided in a central portion in a height direction of a rear end, and a lower guide roller provided in a front end lower portion with an upper rail provided in an upper edge portion of a vehicle body opening, a center rail provided in a central portion in the height direction of a side wall in a vehicle body rear portion adjacent to the vehicle opening, and a lower rail provided in a lower edge portion of the vehicle opening, respectively, so that the slide door can be opened and closed.

As a guide roller of a slide door, there has been used a bearing type roller in which an outer peripheral surface and a top surface of an outer ring are covered with a synthetic resin as shown in JP-A-2003-176661 (see FIGS. 3 and 8), for example. The reason why the bearing type guide roller is used like this is that when a roller constructed as a resin solid roller with the small number of components is used, there arises the disadvantage that the resin solid roller is asymmetrically worn due to a load of the slide door and prevented from smoothly rotating, and thereby the resin solid roller breaks and falls off from a vehicle body in the worst case. The bearing type guide roller has the advantage that the roller itself is difficult to break and hardly falls off from the vehicle body even if the resin part breaks because at least a structure body of the roller is an outer ring made of metal (bearing steel).

BRIEF SUMMARY OF THE INVENTION

However, in the guide roller shown in FIG. 3 of the above described JP-A-2003-176661, since the outer peripheral surface and the top surface of the outer ring are covered with a resin part, and the fixing structure to a bracket which is a support member is calking structure, an engaging part having a recessed groove shape is formed in a middle portion of the support shaft for fitting a calking jig. Therefore, since the diameter of the support shaft becomes thin in a portion of the engaging part having the recessed groove shape, there are the problems of reducing in strength and being complicated in shape to increase machining cost. Further, in the guide roller shown in FIG. 8 of the above described JP-A-2003-176661, the guide roller having the structure in which mounting to the bracket is made by screw fixing, instead of by calking fixing, without forming the above described engaging part having the recessed groove shape is disclosed. Although the mounting structure of the guide roller to the bracket is not disclosed in detail, if the mounting structure is the same mounting structure as the guide roller shown in FIG. 3, the guide roller can be fixed to only a predetermined position with respect to the bracket, and therefore, positioning of the guide roller has to be performed between the bracket and the slide door, which resultantly causes the problem that a part for adjusting a position becomes heavy which makes it difficult to perform fine adjustment. Therefore, there has been a guide roller in which notched planes are formed at screw parts, however since a screw portion of the shaft does not extend on the entire periphery, there has been the case that fastening strength with a nut can not be sufficiently secured.

The present invention is made in view of the above circumstances, and an object of the present invention is to provide a guide roller capable of readily mounting it to a support member and readily adjusting its position without reducing strength of a support shaft.

The solution which is adopted by the present invention is explained with reference to the drawings. The invention according to claim 1 is, as shown in FIGS. 1 to 3, a guide roller 20 which rolls along an upper rail 3 (guide rail) provided at vehicle body outer plates 1a to 1d (on a vehicle body side), and is rotatably and pivotally supported by a support member 11 connected to a slide door 6, and which guide roller 20 is constructed by a support shaft 21 having a columnar shape fixed to the support member 11 by a screw, a ring-shaped outer ring 28 consisting of bearing steel disposed via a plurality of bearings 26 to surround an outer periphery of the support shaft 21, and a covering member 32 made of a synthetic resin covering an outer peripheral surface and a top surface of the outer ring 28, and is characterized in that: in the above described support shaft 21, a whirl-stop seat 33 which enhances the strength of a screw part 23 is provided at an upper end circumference of the screw part 23 formed below the columnar shape, and a flange part 22 for preventing falling down is provided at an upper end circumference of the whirl-stop seat 33; notched planes 34 are formed by cutting in a vertical direction at opposed positions of an outer periphery of the whirl-stop seat 33; a long hole 15 having contact parts 15a which contact the notched planes 34 is formed in the support member 11; and when the screw part 23 of the support shaft 21 is inserted through the long hole 15 of the support member 11 and fixed with a nut 16 on a back side, the screw part 23 is inserted through there while contacting the notched planes 34 of the whirl-stop seat 33 with the contact parts 15a, and an insertion position of the support shaft 21 with respect to the long hole 15 is made adjustable.

Further, the invention according to claim 2 is the guide roller 20 according to claim 1, which is characterized in that after quench-and-temper treatment is performed for the support shaft 21, nitriding treatment is performed.

Further, the invention according to claim 3 is the guide roller 20 according to claim 1 or claim 2, which is characterized in that the covering member 32 is made of a fiber reinforced synthetic resin in which 46 nylon or aromatic polyamide of which softening temperature is high is contained as a main component, and in which special fiber is mixed. Further, as special fiber mixed in the covering member 32, aramid fiber and carbon fiber are raised.

Further, the invention according to claim 4 is the guide roller 20 according to any one of claims 1 to 3, which is characterized in that grinding working is performed for one of or both of a surface of a track recessed part of the support shaft which contacts the bearings, and a surface of a track recessed part of the outer ring which contacts the bearings.

Further, the invention according to claim 5 is the guide roller 20 according to any one of claims 1 to 4, which is characterized in that a phosphate film having a thickness of 10 to 30 μm is formed on the bearing.

Further, the invention according to claim 6 is the guide roller 20 according to any one of claims 1 to 5, which is characterized in that a flange part contact surface of the flange part, which contacts the support member, is formed into a concave-and-convex shape.

In the invention according to claim 1, since the support shaft 21 is fixed to the support member 11 by the screw, it is not necessary to form an engaging part for calking at the support shaft 21 having the columnar shape, so that reduction in strength of the guide roller 20 can be prevented.

Further, since the whirl-stop seat 33 is formed at the upper end circumference of the screw part 23, a root portion of the screw part 33 becomes large, and strength against fastening of the screw part 23 can be enhanced.

Further, when the screw part 23 of the support shaft 21 is inserted through the long hole 15 of the support member 11 and fixed with the nut 16 on the back side, the screw part 23 is inserted through there while contacting the notched planes 34 formed with the whirl-stop seat 33 on the contact parts 15a of the long hole 15 and the insertion position of the support shaft 21 with respect to the long hole 15 is made adjustable, and therefore, positioning of the guide roller 20 with respect to the rail 3 can be performed only by screwing the guide roller 20 to the support member 11 after the support member 11 is previously fixed to the slide door 6, and thereby the operation can be made efficient.

Further, since the notched planes 34 formed on the whirl-stop seat 33 are made to contact the contact parts 15a of the long hole 15, the support shaft 21 does not rotate with respect to the support member 11, whereby loosening of the nut 16 with respect to the screw part 23 can be prevented.

Further, since the notched planes 34 which contact the contact parts 15a of the long hole 15 are formed in the whirl-stop seat 33 as described above, a screw part area does not decrease as in the case where the notched planes 34 are formed on the screw part 23, and the fastening force with respect to the screw part 23 is not reduced.

Furthermore, when the notched planes 34 are formed on the screw part 23, those have to be formed by cutting working after forming the screw part 23, but formation of the notched planes 34 in the whirl-stop seat 33 can be performed by molding with a metallic mold, which is less expensive than the case where the notched planes 34 are formed on the screw part 23, and thereby, reduction in cost of the guide roller 20 can be achieved.

In the invention according to claim 2, after the quench-and-temper treatment is performed for the support shaft 21, the nitriding treatment is performed, and therefore, wear of the guide roller 20 and the bearings 26 can be suppressed without deteriorating elongation of the support shaft 21.

In the invention according to claim 3, since the covering member 32 is made of the fiber reinforced synthetic resin in which 46 nylon or aromatic polyamide of which softening temperature is high is contained as a main component and in which the special fiber is mixed, strength can be enhanced, and since the portion of the covering member 32 made of the synthetic resin, which contacts the rail, does not become flat surface due to temperature at the time of ED coating, smooth rolling of the guide roller 20 with respect to the rail 3 can be maintained.

In the invention according to claim 4, since the grinding working is performed for one of or both of the surface of the track recessed part 25 of the support shaft 21, and the surface of the track recessed part 30 of the outer ring 28, smooth rolling of the bearing can be maintained by improving profiled irregularity of the track recessed parts 25 and 30, and occurrence of abnormal noise can be prevented.

In the invention according to claim 5, since the phosphate film having the thickness of 10 to 30 μm is formed on the bearings 26, friction between the bearings 26, and the track recessed part 25 of the support shaft 21 and the track recessed part 30 of the outer ring 28 is reduced, and adhesion is suppressed by interposition of the different material, whereby occurrence of fretting on the surfaces of the bearings 26 due to vibration of the vehicle body can be prevented.

In the invention according to claim 6, since the flange part contact surface 22a which contacts the support member 11 of the flange part 22 is formed into the concave-and-convex shape, the support shaft 21 is difficult to slip with respect to the support member 11, whereby loosening of the nut 16 against the screw part 23 can be prevented.

Other objects, features and advantages of the invention will become apparent from the following description of the embodiments of the invention taken in conjunction with the accompanying drawings.

DETAILED DESCRIPTION OF THE INVENTION

Figure 1:
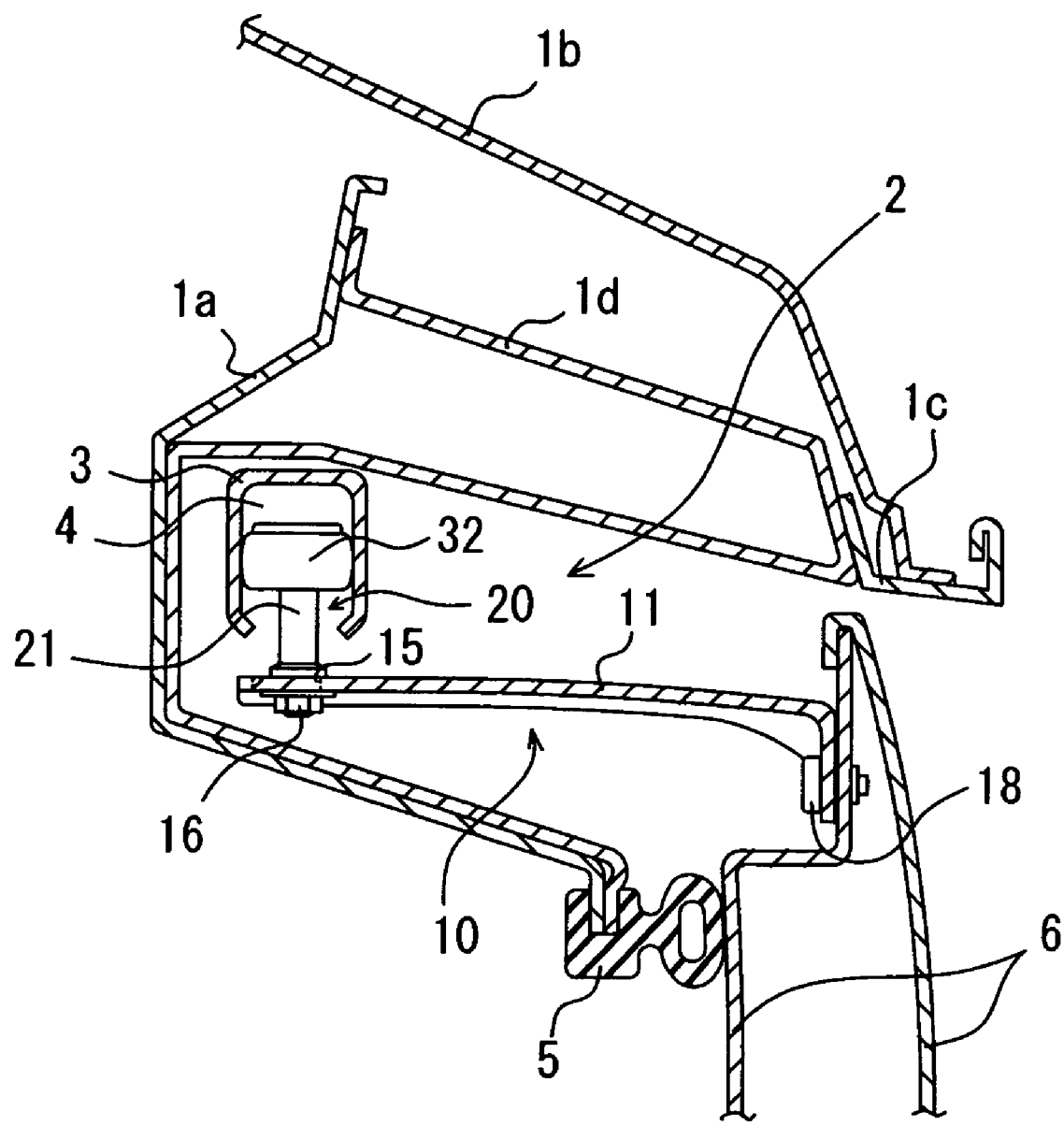
FIG. 1 is a sectional view of an upper rail part to which a guide roller according to this embodiment is applied.
Figure 2:
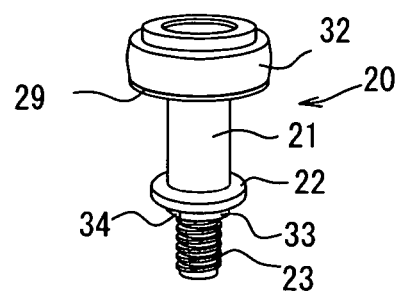
FIG. 2 is an exploded perspective view of an upper guide roller mechanism to which the guide roller is applied.
Figure 2:
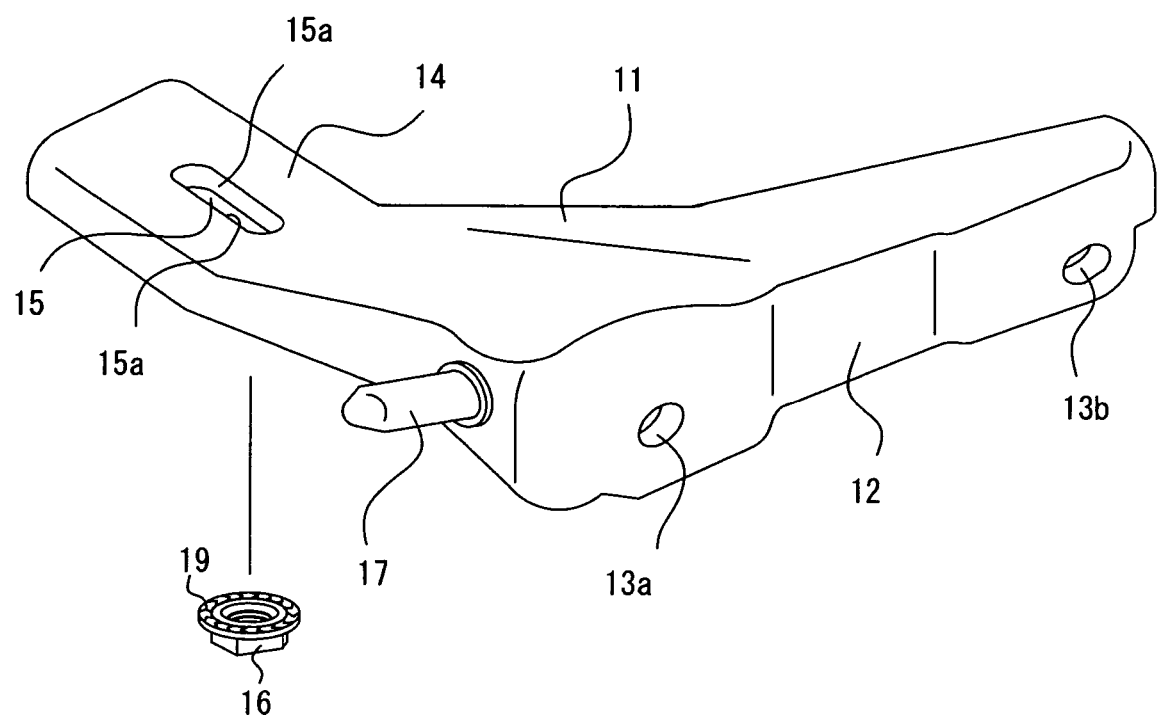
Figure 3:
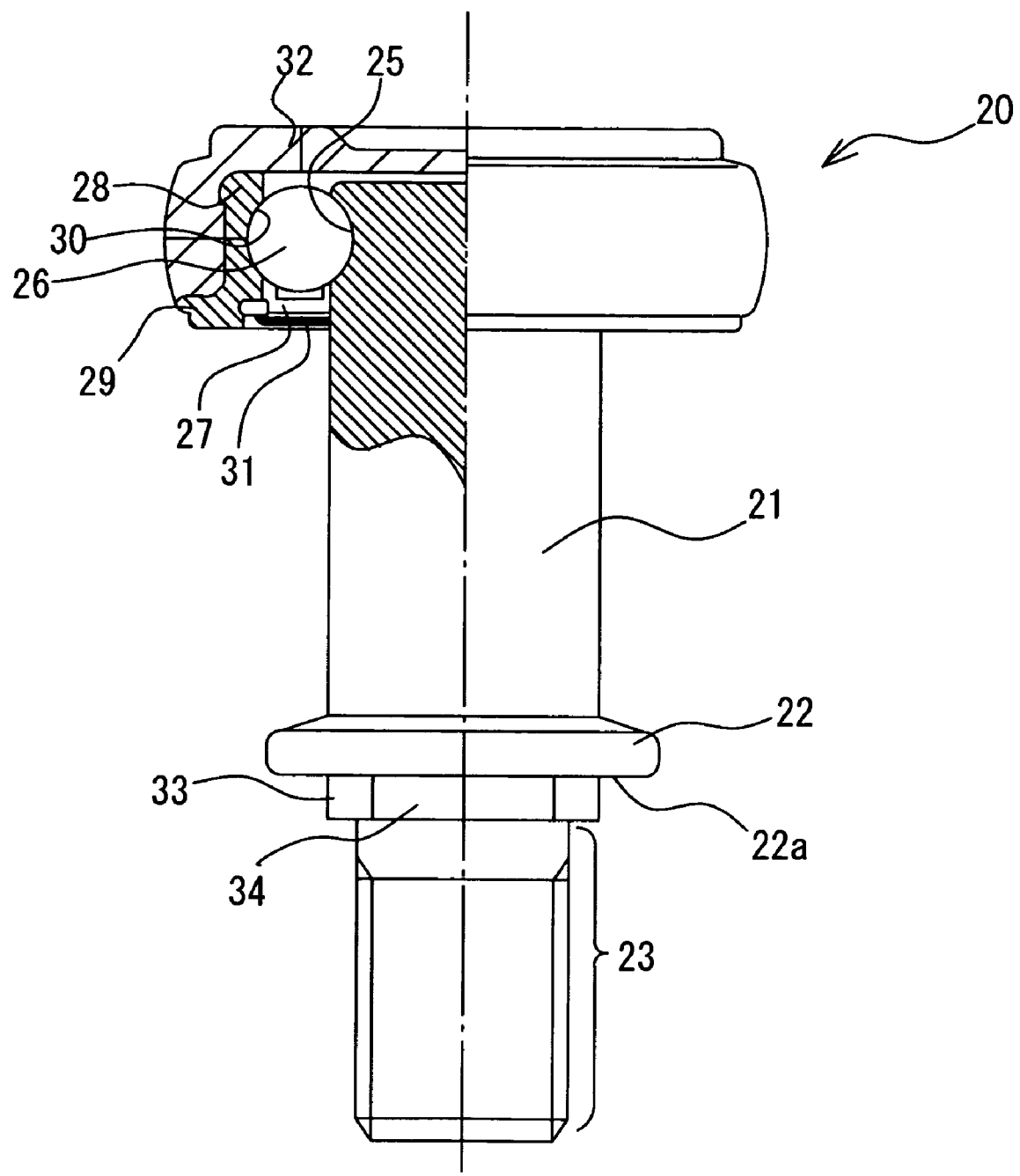
FIG. 3 is a partial cutaway front view showing internal structure of the guide roller.
Figure 4:
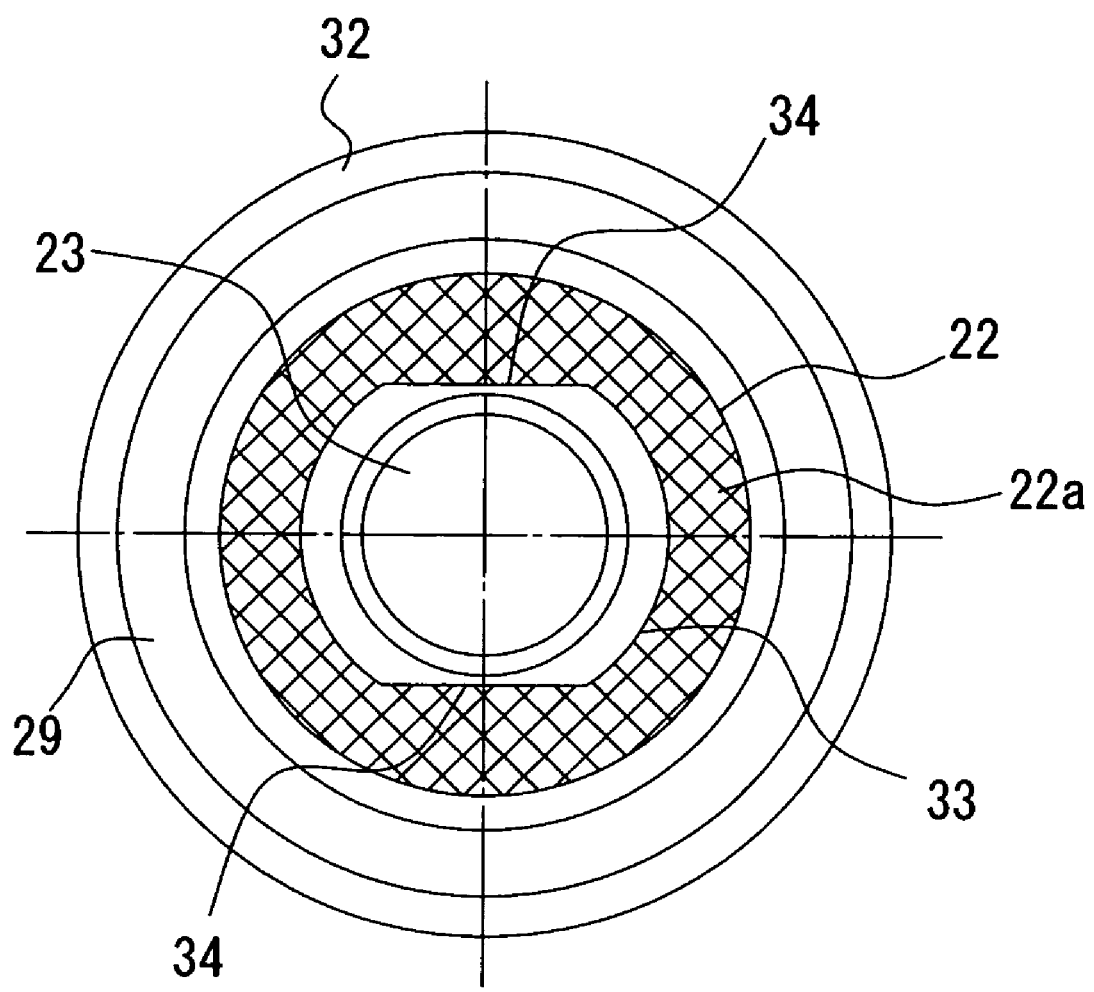
FIG. 4 is a bottom view of the guide roller.

Hereinafter, one embodiment of a guide roller of a vehicle slide door according to the present invention will be described with reference to FIGS. 1 to 4. FIG. 1 is a sectional view of an upper rail part to which a guide roller 20 according to the embodiment is applied, FIG. 2 is an exploded perspective view of an upper guide roller mechanism 10 to which the guide roller 20 is applied, FIG. 3 is a partial cutaway front view showing internal structure of the guide roller 20, and FIG. 4 is a bottom view of the guide roller 20.

As described above, an upper guide roller provided in a front end upper portion of the slide door, a center guide roller provided in a central portion in a height direction of a rear end, and a lower guide roller provided in a front end lower portion are rollably engaged with an upper rail provided in an upper edge portion of a vehicle body opening, a center rail provided in a central portion in a height direction of a vehicle body rear portion side wall adjacent to the vehicle body opening, and a lower rail provided in a lower edge portion of the vehicle body opening, respectively, so that the slide door is slidably supported along the vehicle body side wall, and the slide door of the vehicle can be opened and closed by sliding this slide door. The embodiment shown in the drawings shows a guide roller according to the present invention which is applied to the above described upper guide roller mechanism 10.

As shown in FIG. 1, an upper rail 3 is mounted in a recessed part 2 for laying a rail which is formed by assembling a plurality of vehicle body outer plates 1a to 1d by welding to have a substantially U-shaped section and an opening opened sideway. The upper rail 3 is formed into an inversed U-shape with an opening opened downward so as to form a guide roller chamber 4 in which a guide roller 20 is housed. A rubber packing 5 for securing fitting between the slide opening and the slide door 6 when the slide door 6 is closed is fitted to a lower end portion of the recessed part 2.

The guide roller 20 of the upper guide roller mechanism 10 is rollably engaged with the upper rail 3 which is constructed as described above, and the upper rail 3 is connected to the slide door 6 via a support member 11 of the upper guide roller mechanism 10. Here, the upper guide roller mechanism 10 will be described with reference to FIGS. 1 and 2.

The upper guide roller mechanism 10 is constructed by the support member 11 formed in an inversed L shape in the plane view, and the guide roller 20 which is rotatably mounted on a guide roller mounting piece part 14 forming one end side of the support member 11. In more detail, the one end side of the support member 11 formed in the inversed L shape is formed as a door mounting piece part 12 which hangs in a vertical direction, and door mounting holes 13a and 13b are provided at positions separated in a left and right direction of the door mounting piece part 12 as shown in FIG. 2. The door mounting holes 13a and 13b are the mounting holes for mounting the support member 11 to an inner side of the upper end portion of the slide door 6 with bolts 18 as shown in FIG. 1.

Meanwhile, the other end side of the support member 11 formed in the inversed L shape is formed as the guide roller mounting piece part 14 extending in an orthogonal direction from the above described door mounting piece part 12, and a long hole 15 having a track shape is provided near a tip end of its top surface. A support shaft 21 of the guide roller 20 is inserted through the long hole 15 and fastened with a nut 16 from a back surface. An inner periphery in a longitudinal direction of the long hole 15 forms linear contact parts 15a which contact notched planes 34 formed in a whirl-stop seat 33 of the support shaft 21. A guide projection 17 which engages in an engaging groove (not shown) formed on the vehicle body side when the slide door 6 is closed is projectingly provided on a front surface side of an L-shaped corner portion of the support member 11 to perform positioning of a final closing position of the slide door 6.

In the upper guide roller mechanism 10 constructed as described above, the guide roller 20 is housed in the guide roller chamber 4 of the upper rail 3 so as to roll there while contacting left and right side surfaces of the guide roller chamber 4 in connection with slide movement of the slide door 6.

Next, the construction of the guide roller 20 will be described in detail, mainly with reference to FIGS. 3 and 4. The guide roller 20 is constructed by the columnar support shaft 21 which is fixed to the guide roller mounting piece part 14 of the above described support member 11 by screwing, a ring-shaped outer ring 28 made of bearing steel and disposed via a plurality of bearings 26 to surround an outer periphery of the support shaft 21, and a covering member 32 made of a synthetic resin which covers an outer peripheral surface and a top surface of the outer ring 28.

The support shaft 21 is formed by a column member of medium carbon steel (S35C or S45C, for example). A flange part 22 for preventing falling down is circumferentially provided just below a substantially intermediate portion of the support shaft 21, the whirl-stop seat 33 which enhances the strength of a screw part 23 is formed below the flange part 22, and further, a portion below the whirl-stop seat 33 is the screw part 23. A flange part contact surface 22a of the flange part 22 which contacts the support member 11 is formed in a concave and convex shape (or an uneven shape). The concave and convex shape is the shape which is formed in, for example, a lattice shape, a corrugated shape, or the like.

The whirl-stop seat 33 is formed into a shape which is cut off in a vertical direction in opposed positions of the outer periphery of the cylinder, and cut off portions are formed as notched planes 34. The notched planes 34 are adapted to contact the contact parts 15a when the screw part 23 of the support shaft 21 is inserted through the long hole 15 of the support member 11 as described above. The notched planes 34 are formed in the whirl-stop seat 33 as described above, and therefore, those can be formed by molding processing by a metallic mold. Therefore, those do not have to be formed by cutting processing after formation of the screw part 23 as in the case of forming the notched planes 34 in the screw part 23, and those are made at lower cost than the case of forming the notched planes 34 in the screw part 23, whereby cost of the guide roller 20 can be reduced.

Since the whirl-stop seat 33 is formed on an upper end circumference of the screw part 23, the diameter of a root portion of the screw part 23 becomes large, and thus its strength against the fastening of the screw part 23 can be enhanced.

Since the dimension in the longitudinal direction of the long hole 15 is larger than the diameter of the arc portion of the whirl-stop seat 33, the fastening position of the support shaft 21 can be moved in the long hole 15. Further, an arc-shaped track recessed part 25 which contacts the bearing 26 is formed in an upper portion of the support shaft 21. Since grinding processing is performed for a surface of the track recessed part 25, profile irregularity is improved, whereby smooth rolling of the bearing can be maintained, and occurrence of abnormal noise can be prevented.

On the other hand, the support shaft 21 is required to have contradicting performances, namely, hardness for improving wear resistance of the track recessed part 25 which is a track of the bearing 26, and softness (elongation) for resisting twist at the time of fastening a screw against the screw part 23. In order to ensure the contradicting performances, induction hardening is sometimes performed only for the track recessed part 25 made of medium carbon steel, but there has been the disadvantage that operability is not good because the hardened portion is limited. Therefore, the support shaft 21 according to this embodiment is also given proper hardness without inhibiting elongation by performing quench-and-temper treatment for the entire support shaft 21 made of medium carbon steel, and operability can be enhanced. Further, by performing nitriding treatment for the support shaft 21, sliding characteristics (wear resistance, low frictional property) of the track recessed part 25 is enhanced, and anti-corrosive property can be enhanced.

Further, a plurality of bearings 26 are disposed at regular intervals by a retainer 27 between the above described support shaft 21 and the outer ring 28. Grease is applied between the bearings 26. In the ring-shaped outer ring 28 disposed to surround the outer periphery of the support shaft 21, a flange part 29 is integrally formed at a lower end of an outer peripheral surface, and an arc-shaped track recessed part 30 which contacts the above described bearings 26 is formed on its inner peripheral surface. The outer ring 28 is constructed by bearing steel (for example, SUJ-2), and vacuum hardening treatment is performed for the entire outer ring 28. As a result of performing the vacuum hardening treatment for the entire outer ring 28 like this, the hardness of the track recessed part 30 becomes HRc 58 to 65, and therefore the outer ring 28 is constructed to have durability against frictional wear with respect to the bearings 26. Since grinding working is performed for a surface of the track recessed part 30 of the outer ring 28 like the track recessed part 25 of the above described support shaft 21, profile irregularity is improved, whereby smooth rolling of the bearings 26 can be maintained, and occurrence of abnormal noise can be prevented.

Further, since a phosphate film of a thickness of 10 to 30 μm is formed on the above described bearings 26, friction between the bearings 26, and the track recessed part 25 of the support shaft 21 and the track recessed part 30 of the outer ring 28 is reduced, and since adhesion is suppressed by interposition of the different material, occurrence of fretting on the surfaces of the bearings 26 due to vibration of the vehicle body can be prevented. As a phosphate film, zinc phosphate, manganese phosphate, calcium phosphate, ferric phosphate and the like are raised, for example. In the case that the thickness of the phosphate film is less than 10 μm, however, the phosphate film will wear at the time of initial wear for conformity. When the thickness of the phosphate film exceeds 30 μm, the phosphate film strength reduces, and peeling will occur in the film layer. Accordingly, the effect of prevention of occurrence of fretting can be provided in the range of the thickness of the phosphate film of 10 μm to 30 μm.

The covering member 32 of a synthetic resin is constructed by a fiber reinforced synthetic resin in which 46 nylon or aromatic polyamide of which softening temperature is higher than 66 nylon is contained as a main component and in which not more than 10 wt % (preferably, 2 to 6 wt %) of special fiber such as aramid fiber and carbon fiber is mixed. The covering member 32 is provided to cover the outer peripheral surface and the top surface of the outer ring 28 by insert molding, and when the covering member 32 is provided, a lower end of the covering member 32 is engaged with and fastened to the flange part 29 of the outer ring 28, and therefore, the covering member 32 of the synthetic resin does not fall off from the outer ring 28. Further, since the covering member 32 made of the synthetic resin is the fiber reinforced synthetic resin in which 46 nylon or aromatic polyamide (of which softening temperature is high) is contained as a main component and in which the special fiber is mixed therein, strength can be enhanced, and the portion of the covering member 32 made of the synthetic resin which contacts the guide rail does not become a flat surface due to the temperature at the time of ED coating. Therefore, smooth movement of the slide door 6 can be maintained. In the guide roller 20 constructed by the support shaft 21, the outer ring 28, the bearing 26 and the covering member 32 as described above, foreign substances do not enter the inside in the state where the support shaft 21 is assembled to the outer ring 28 since its undersurface is sealed with the seal ring 31.

In order to mount the guide roller 20 having the above described structure on the support member 11, the screw part 23 of the guide roller 20 is inserted through the long hole 15 of the guide roller mounting piece part 14, and the flange part contact surface 22a of the flange part 22 is made to contact the top surface of the guide roller mounting piece part 14. When the screw part 23 is inserted through the long hole 15, the screw part 23 is inserted while contacting the notched planes 34 of the whirl-stop seat 33 with the contact parts 15a of the long hole 15. Thereafter, the nut 16 is fastened from the back surface of the guide roller mounting piece part 14. At the time of this fastening, the notched planes 34 are in the state that those contact and are held by the contact parts 15a, which provides the whirl-stop function, and fastening operation of the nut 16 to the screw part 23 is facilitated. However, at the time of the fastening, it is suitable to fasten the nut 16 loosely enough for the support shaft 21 to move with respect to the long hole 15.

Further, in the state where the upper guide roller mechanism 10 of which the guide roller 20 is screwed and fixed to the support member 11 as described above is firmly fixed to the inner side of the upper end portion of the slide door 6 by the bolt 18, in order to mount the entire slide door 6 on the upper rail 3, the guide roller 20 is firstly inserted into the guide roller chamber 4 of the upper rail 3, final position adjustment of the guide roller 20 is performed, and then the nut 16 is firmly fastened. The flange part 22 contacts the top surface of the support member 11 by the final fastening of the nut 16, and therefore, even if it is used for long periods, deformation such as inclination of the support shaft 21 or the like can be prevented.

Besides, as described above, the flange contact surface 22a of the flange part 22 is formed in the convex-and-concave shape, and looseness-prevention-projections 19 are projectingly provided all over the circumference on a surface of the nut 16a, which surface is formed on the nut 16a and contacts the support member 11 of the flange, as shown in FIG. 2. Therefore, when the nub 16 is finally fixed, the support shaft 21 and the nut 16 are difficult to slip with respect to the support member 11, and therefore, looseness of the nut 16 with respect to the screw part 23 can be prevented. As described above, since the notched planes 34 which are formed on the whirl-stop seat 33 are in contact with the contact parts 15a of the long hole 15, the support shaft 21 does not rotate with respect to the support member 11, whereby looseness of the nut 16 with respect to the screw part 23 can be also prevented.

Further, since the notched planes 34 which are adapted to contact the contact parts 15a of the long hole 15 are formed on the whirl-stop seat 33 as described above, the screw part area does not decrease as in the case where the notched planes 34 are formed in the screw part 23, and thus fastening force with respect to the screw part 23 is not reduced.

In the embodiment described above, the case where the guide roller 20 is assembled to the upper guide roller mechanism 10 is described, but the present invention can be also applied to a guide roller which is assembled to a center guide roller mechanism or a lower guide roller mechanism.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A guide roller of a slide door for a vehicle, which rolls along a rail provided on a vehicle body side and is rotatably and pivotally supported by a support member connected to the slide door, comprising:
   a columnar-shaped support shaft fixed to the support member by screwing;
   a ring-shaped outer ring made of bearing steel disposed via a plurality of bearings to surround an outer periphery of the support shaft; and
   a covering member made of a synthetic resin covering an outer peripheral surface and a top surface of the outer ring, wherein
   said support shaft is provided with, at a periphery thereof, a whirl-stop seat provided at an upper end circumference of a screw part formed in a lower part of the column shape for enhancing strength of the screw part, and a flange part provided at an upper end circumference of the whirl-stop seat for preventing falling down, and notched planes are formed by cutting the whirl-stop seat in a vertical direction at opposed positions of an outer periphery of the whirl-stop seat;
   said support member comprises a long hole formed therein, the long hole having contact parts which contact the notched planes; and
   when the screw part of the support shaft is inserted through the long hole of the support member and is fixed by a nut on a back side, the screw part is inserted through there while contacting the notched planes of the whirl-stop seat with the contact parts, and an insertion position of the support shaft with respect to the long hole is made adjustable.

2. The guide roller of the slide door for a vehicle according to claim 1, wherein the support shaft is subjected to nitriding treatment after being subjected to quench-and-temper treatment.

3. The guide roller of the slide door for a vehicle according to claim 1, wherein the covering member is made of a fiber reinforced synthetic resin in which 46 nylon or aromatic polyamide having a high softening temperature is contained as a main component, and into which special fiber is mixed.

4. The guide roller of the slide door for a vehicle according to claim 1, wherein grinding processing is performed for one of or both of a surface of a track recessed part of the support shaft which contacts the bearings, and a surface of a track recessed part of the outer ring which contacts the bearings.

5. The guide roller of the slide door for a vehicle according to claim 1, wherein a phosphate film is formed on the bearings.

6. The guide roller of the slide door for a vehicle according to claim 1, wherein a flange part contact surface of the flange part which contacts the support member is formed in a concave-and-convex shape.

\* \* \* \* \*